United States Patent Office 3,623,337
Patented Nov. 30, 1971

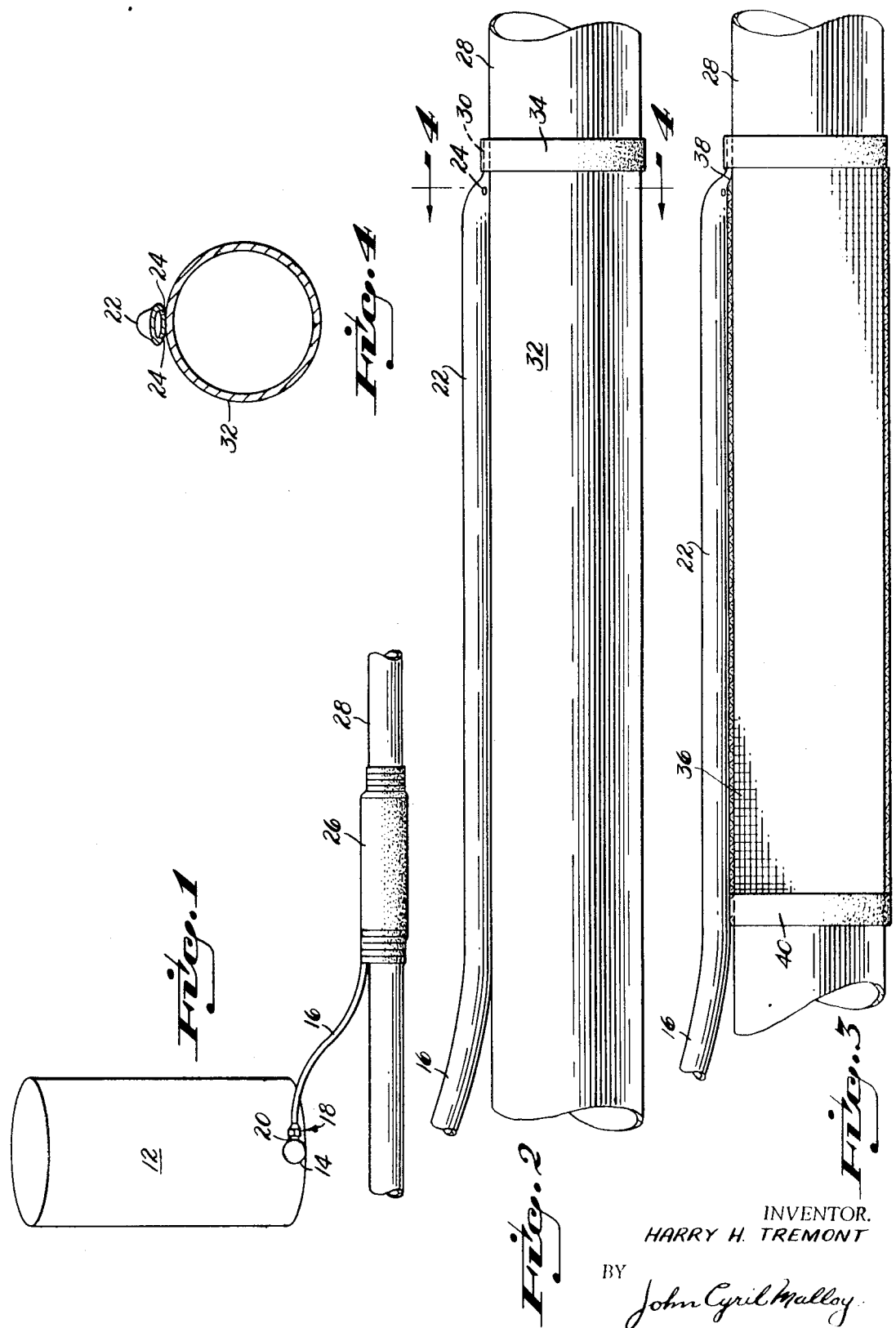

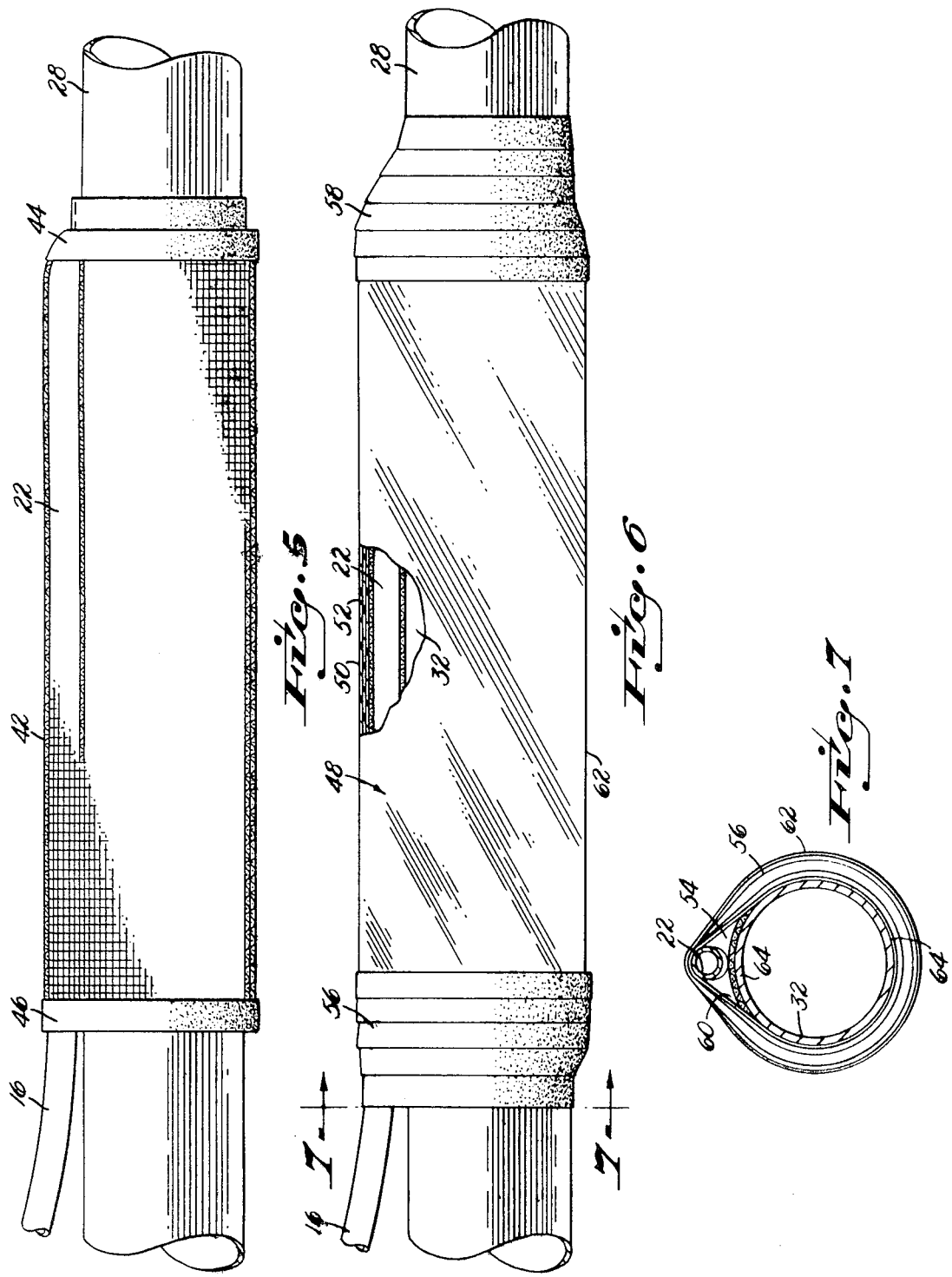

3,623,337
APPARATUS FOR FREEZING LIQUID IN A
SECTION OF A PIPE
Harry H. Tremont, Miami, Fla.
(501 Oakridge Drive, Indialantic, Fla. 32903)
Original application Aug. 7, 1968, Ser. No. 750,893, now
Patent No. 3,498,071, dated Mar. 3, 1970. Divided
and this application Jan. 13, 1970, Ser. No. 2,628
Int. Cl. F25d 3/00
U.S. Cl. 62—293      5 Claims

ABSTRACT OF THE DISCLOSURE

Apparatus for freezing liquid in a section of a pipe which includes a supply line leading from a container of liquified gas along a length of a pipe in which fluid is flowing and means for jacketing the supply line in sealed relation about the section of the pipe so that the liquified gas may be caused to flow through the jacket to extract heat and rapidly freeze the section of the pipe.

This is a division of application Ser. No. 750,893, filed Aug. 7, 1968, now U.S. Patent No. 3,498,071.

This invention relates to an apparatus and process for quickly freezing liquid in a section of a pipe by the use of relatively inexpensive and light-weight materials which are adapted to be installed at a job site with a minimum amount of equipment. In the past, it has often been desirable to isolate a section of a fluid flow system to facilitate repair thereof without interference with the remainder of the system, such as a section of the floor of a hotel occupied by guests. Preferably, this is done by freezing a section of the system in series therewith. The present invention provides means to rapidly freeze a section of a pipe to achieve this purpose. The apparatus means employs the utilization of a liquified gas maintained in a highly insulated or super cold container which is adapted to be metered or flowed to a sealed jacket circumposed about a pipe section containing fluid. The gas is of the type which includes liquified air which is relatively inexpensive or other gases which are known as cyrogenic fluids and inert gases, such as krypton, neon and nitrogen.

It is, accordingly, an object of this invention to provide a means and apparatus for supplying liquified gas to a sealed jacket circumposed about a section of a pipe to freeze liquid within the pipe which is adapted to be readily installed and used at a variety of locations.

It is another object of this invention to provide an apparatus for utilizing liquified gases contained in a highly insulated container and releasing the same through a supply line arranged along a length of a pipe and sealingly jacketed so that the liquified gas may be flowed through the jacket to freeze liquid in the pipe.

It is a general object of this invention to provide an apparatus for the utilization of super cold liquids in an inexpensive, highly portable and flexible manner to adapt the same for use in freezing a plug of fluid having a freezing point above approximately 5 degrees Kelvin in a pipe so that the downstream portion of the pipe may be isolated for repair.

It is another object of this invention to provide an apparatus for the purposes described which is simple and inexpensive to install in relation to a section of a pipe in a fluid flow system which includes jacketing means to jacket the pipe and a container of liquified gas with means to connect the container to the jacket interior and to distribute liquidfied gas metered from the supply container through the jacket to freeze fluid in the pipe.

In accordance with these and other objects which will become apparent hereinafter, the instant invention will now be described with reference to the accompanying drawings in which:

FIG. 1 is a perspective view of the apparatus for freezing liquid in the section of the pipe shown;

FIGS. 2, 3, 5 and 6 are enlarged partial views of the jacketed portion of the pipe of FIG. 1 and illustrate, respectively, the application of the apparatus to the pipe as follows:

In FIG. 2, the supply line for the liquified gas is illustrated in overlying relation along a length of the pipe section;

In FIG. 3, a diffuser screen is shown intermediate the supply line and the pipe surface;

In FIG. 5, a diffuser sleeve is shown in circumposed relation about the supply line and pipe section; and In FIG. 6, the jacketed pipe is illustrated with the jacket being partially broken away to show the details of the construction;

FIG. 4 is a view in cross section taken along the plane indicated by the line 4—4 of FIG. 2 and looking in the direction of the arrows; and FIG. 7 is a view in cross section taken along the plane indicated by the line 7—7 of FIG. 6 and looking in the direction of the arrows.

Referring to the drawings, wherein like characters designate like or corresponding parts throughout the different views, there is shown in FIG. 1 a supply container 12 which is heavily insulated and within which a supply of liquified gas is contained. The contained 12 is provided with suitable venting means and control gauges and includes a supply valve 14. A supply line 16 is provided which includes means 18 comprising a fitting to connect to a nipple 20 on the valve in fluid-tight relation. The terminal end portion 22 of the supply line 16 is provided with discharge means 24 preferably comprising a plurality of orifices, and the supply line is prefedably insulated along the main length thereof between the container and the end portion 22. The jacket 26 is provided along a section 28 of a pipe through which fluid flows and a construction of the jacket will now be described. The distal end 30 of the end portion 22 of the supply line is positioned at one end of the axially-extending length 32 of the pipe over which the end portion 22 is positioned; and the end portion is secured by suitable means, such as the band of tape 34. In the preferred embodiment, diffuser means of heat exchanging matedial, such as a sleeve 36 of flexible copper wire or other material characterized by a high coefficient of heat transfer, is provided in circumposed relation about the length 32 and intermediate the confronting surfaces of the end portion 22 and the length 32, one end of the sleeve nesting in the crotch 38 defined between the distal end 30 of the supply line and its securement to the pipe by the means 34, and the other end of the sleeve or diffuser being secured to the pipe by suitable means such as the band of tape 40.

Referring to FIG. 5, an illustration of the preferred embodiment is seen which includes an outer sleeve or coil layer of the diffuser means of screen material, the outer layer 42 comprising a wrapping circumposed about and joining together the end portion 22 and the length 32. Suitable means, such as the tape means 44 and 46, are provided to interconnect the diffuser means through the length of the pipe. The means to jacket the end portion and the length of the section comprises a jacket 48 which is preferably composed of a plurality of layers 50 and 52 of flexible impermeable plastic material. As seen in FIG. 6, the jacket is arranged so as to completely envelope the length including the preferred diffuser and the end portion 22 of the supply line with the exception of vent means 54, seen in FIG. 7 in the upper portion of the jacket. Means to seal the jacket comprise a plurality of overlaying tape lengths 56 and 58 to secure the marginal ends of the jacket layers together and to the pipe.

In operation, the supply line from the container is attached to the length of a pipe section to be frozen and secured by the tape means. The wire screen is convoluted first about the length of the pipe and thence about the end portion of the supply line sandwiching the supply line between the screen and along the exterior length of the pipe in the section to be frozen. The section is then jacketed by wrapping flexible plastic sheet material around the end portion of the supply line, the pipe and the wire screen using at least one convolution of the plastic material for each ¼ inch of pipe diameter. The ends of the plastic jacket are sealed and a vent provided at the highest portion of the jacket. It will be noted that preferably the orifices are located at one end of the jacket and the vent means at the other so that when the supply valve is manipulated the liquefied gas will course through the interior chamber 60 between the outer jacket surface 62 and the outer surface 64 of the pipe to extract heat and rapidly freeze the fluid flowing in the pipe. It will be apparent that although the pipe section 28 illustrated is shown in a horizontal attitude, the device may be utilized with equal effectiveness without the need of pumps to provide a frozen plug in a vertically-extending pipe section. It will be further apparent that by reason of the flexible materials utilized for the jacketing and diffusing, a wide variety of pipe shapes and sizes may be subjected to the operation and that locations which are difficult of access present no problem to the utilization of the process described above.

It is thus seen that this invention provides as apparatus to freeze fluid in a pipe which utilizes a heavily insulated supply vessel or container and a cyrogenic fluid without exposure of the operator, and that the materials employed are flexible and adaptable for application to various sizes and shapes of pipes. The materials may be cut on the job or provided in predetermined kits to fit practically any situation expected to be encountered. The apparatus provides means to distribute the liquefied gas either in liquid or in a gaseous state within the jacket to effect a transfer of heat from the pipe and fluid with the diffuser screen uniformly distributing the heat transferred and tending to condense the liquified gas emitted from the orifice with the screen providing a large area in heat exchanging relation with the pipes to uniformly extract heat therefrom.

While the instant invention has been shown and described herein in what is conceived to be the most practical and preferred embodiment, it is recognized that departures may be made therefrom within the scope of the invention, which is, therefore, not to be limited to the details disclosed herein, but is to be accorded the full scope of the claims so as to embrace any and all equivalent apparatus.

What is claimed is:

1. Apparatus for freezing liquid in a section of a pipe including:
   an insulated container and a supply of liquified gas in said container of the class which is in the gaseous state within the range of standard atmospheric pressures and ambient temperature conditions;
   valve means to discharge said gas from said insulated container;
   a supply line and means to connect one end of said supply line to said valve means, said supply line including discharge means at the terminal end thereof, the terminal end portion of said supply line being adapted to overly an axially extending length of a section of pipe; and
   flexible envelope means adapted to jacket the end portion and the length of a pipe section with said discharge means at one end of said jacket, and said means having vent means in the upper portion,
   means adapted to seal the jacket about the end portion and a pipe length so that the liquified gas may be flowed from the tank through the supply line and discharge means into said jacket to freeze liquid in a pipe section and form a plug.

2. The apparatus as set forth in claim 1 wherein said means to jacket comprises a plurality of concentric coils of flexible impermeable plastic material.

3. The apparatus as set forth in claim 2 wherein said means adapted to seal the jacket comprises tape means to secure the overlying marginal edges of the concentric coils and the opposite ends of the length of a section of pipe.

4. The apparatus as set forth in claim 2 wherein a diffuser means is provided in said jacket to uniformly distribute the heat being withdrawn by the gas.

5. The apparatus as set forth in claim 4 wherein said diffuser means comprises a sleeve of flexible screen material characterized by a high coefficient of heat transfer.

References Cited

UNITED STATES PATENTS

| | | | |
|---|---|---|---|
| 2,572,555 | 10/1951 | Young et al. | 138—97 X |
| 3,041,850 | 7/1962 | Nunn | 62—293 |
| 3,498,071 | 3/1970 | Tremont | 62—66 |

MEYER PERLIN, Primary Examiner

P. D. FERGUSON, Assistant Examiner

U.S. Cl. X.R.

62—514, 530; 137—315; 138—97; 165—46